W. H. BRISTOL.
RECORDING INSTRUMENT.
APPLICATION FILED DEC. 24, 1908.
918,274.
Patented Apr. 13, 1909.
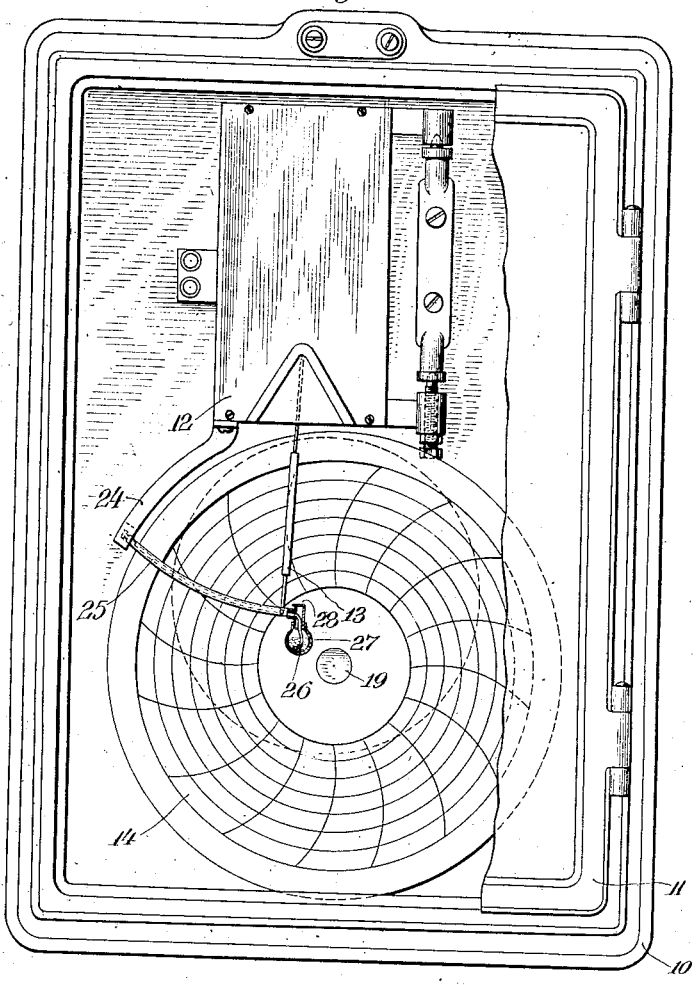
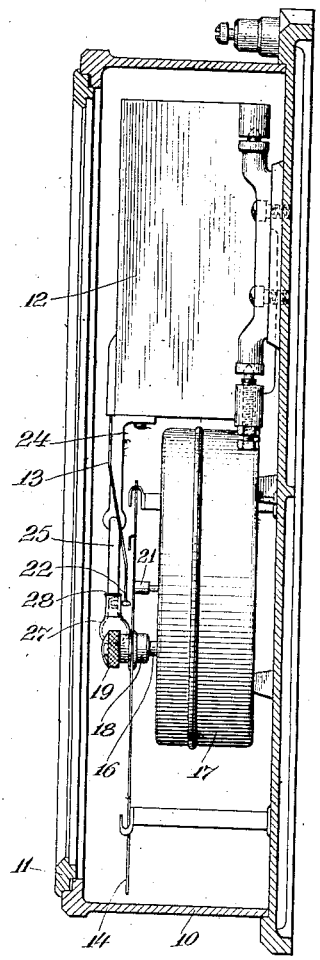
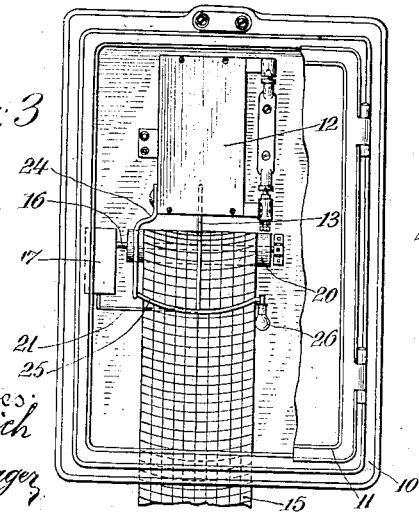
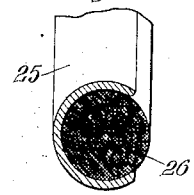
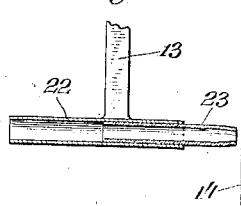
Witnesses:
F. N. Roehrich
John E. Prager
William H. Bristol Inventor
By his Attorney

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

RECORDING INSTRUMENT.

No. 918,274.      Specification of Letters Patent.      Patented April 13, 1909.

Application filed December 24, 1908. Serial No. 469,065.

*To all whom it may concern:*

Be it known that I, WILLIAM H. BRISTOL, a citizen of the United States, and a resident of Waterbury, in the county of New Haven and State of Connecticut, have invented certain new and useful Improvements in Recording Instruments, of which the following is a specification.

My invention relates to improvements in recording devices; and particularly to that class of recording devices designed for extreme sensitiveness, and in which the recording arm swings freely, being normally free and clear of the record surface, as for example the recording device disclosed in my prior U. S. patent #813,689.

It has for its object to feed the marking fluid to the recording arm in such a manner that the said arm is required to carry only a minimum and constant amount of the marking fluid, whereby the sensitiveness of the instrument is not impaired; and also, to provide means for delivering the marking fluid to a record surface located in a vertical plane, whether the record surface be of the circular or strip type, thereby permitting the record to be readily observed and affording an instrument suited for switchboards.

Figure 1 is a front elevation of my improved recording device, a portion of the cover being broken away. Fig. 2 is a partial vertical section of same. Fig. 3 is a view of a modification. Figs. 4 and 5 are detail views showing respectively, on an enlarged scale, the receptacle for retaining the marking fluid, and a portion of the recording surface and recording arm with its capillary tube.

Similar characters of reference designate corresponding parts throughout the several views.

Referring to the drawings, Figs. 1 and 2, 10 designates the containing casing to which is hinged the usual glass cover 11. Hinged to the back of the casing 10 is a casing 12 which contains the actuating mechanism (not shown) for the recording arm 13 adapted to move over a record surface which may be either of the circular type 14, Figs. 1 and 2; or of the strip type 15, Fig. 3. This record surface is advanced through an arbor 16 driven by a suitable clock 17, the chart 14 being revolved by the hub 18 and nut 19 on driving arbor 16 of the clock; and the strip 15 advanced by a drum 20 likewise driven by the arbor 16. A portion of the circular chart 14, or the strip 15, in proximity to the arm 13 is unsupported and is designed to be periodically tapped by means of a hammer 21 driven by the clock 17; or, if desired, by a separate movement (not shown), as fully set forth in my prior U. S. patent #813,689.

The recording arm 13 carries at its free end a capillary tube 22 adapted to retain a minimum quantity of marking fluid, its marking end being preferably reduced, as shown in the detail view Fig. 5, to improve and to direct the capillary action and to afford a fine marking point. This is readily obtained by inserting a second capillary tube 23 within the tube 22, Fig. 5. I prefer to employ a capillary tube of glass as the second or marking tube 23, as it is a very easy matter to obtain a fine point with same, and the tube being of glass is not corroded by the ink and thus reduces the danger of becoming clogged. The arm 13, of course, may be provided with only one tube and this may be of glass or other suitable material.

Secured to the actuating mechanism casing 12, is a bracket 24 carrying a receptacle 25 for the marking fluid used to make a record upon the recording surface 14 or 15. This receptacle is shown in the form of a tube, cut longitudinally at one side, and containing some suitable absorbent material as a wick 26. One end of the wick 26 dips into a well 27 attached to and below the tube 25 and containing sufficient marking fluid. A lid 28 closes the well to prevent the entrance of the dust and other foreign material. The bracket 24, receptacle 25 and well 27 swing with the casing 12 and its recording arm 13, so that the various mechanisms maintain their relative positions, and the entire mechanism may be swung out of the way when it is desired to replace a record surface. The ink or other marking fluid is drawn from the well 27 by the wick 26 which becomes thoroughly soaked thereby and provides at its exposed portion a suitable inking pad for the capillary tubes 22 and 23 which are filled with a minimum quantity of ink. As a portion of the record surface is tapped by the hammer 21, it vibrates and communicates the vibration to the arm 13 which normally swings free and clear of both the record surface and inking pad. This causes its tube 23 to make a record, and practically simultaneously therewith to impinge against the ink pad 26 and thus receive a slight supply of ink. A proper supply is thus afforded to tube 22 and is delivered through tube 23 to the record surface 14 or 15, the total quantity of ink carried by the tubes 22 and 23 and thereby the arm 13, however, being extremely small. The sensitiveness of the instrument is thereby not impaired; and the desirable features, of having an ink record and one which is made upon a chart in a vertical plane, are obtained.

Although I have illustrated and described the device with the record surface vibrated it is understood that if desired, either of the other two recording elements—the recording arm or the inking pad—might be vibrated.

I claim:—

1. In a recording device: the combination with a movable record surface, a recording arm, a capillary marking tube carried by same, and a source of marking fluid, of means to cause said marking tube to periodically make contact with said source of marking fluid and with said record surface.

2. In a recording device: the combination with a movable record surface, a recording arm, a marking tube carried by same, and a source of marking fluid, of means to cause said tube to periodically and simultaneously make contact with said source of marking fluid and with said record surface.

3. In a recording device: the combination with a movable record surface, a recording arm, a capillary tube open at both ends and carried by said arm, and a source of marking fluid in the path described by said tube, of means to cause said tube to periodically make contact with said source of marking fluid and with said record surface.

4. In a recording device: the combination with a movable record surface, a recording arm, a capillary tube open at both ends and carried by said arm, and a source of marking fluid in the path described by said tube, of means to periodically vibrate said record surface to cause said tube to make contact with said source of marking fluid and with said record surface.

5. In a recording device: the combination with a movable record surface, a recording arm and a source of marking fluid, of a capillary tube carried by said recording arm, open at both ends and located between said source of marking fluid and said record surface, and means to cause said tube to periodically make contact with said source of marking fluid and with said record surface.

6. In a recording device: the combination with a movable record surface, a recording arm and a source of marking fluid, of a capillary tube carried by said recording arm, open at both ends and located between said source of marking fluid and said record surface, and means to periodically vibrate said record surface to cause the said capillary tube to periodically make contact with said source of marking fluid and with said record surface.

7. In a recording device: the combination with a movable record surface, a recording arm and an inking pad in the path described by said arm, of a capillary tube carried by said recording arm, open at both ends and located between said inking pad and said record surface, and means to periodically vibrate said record surface to cause the said capillary tube to periodically make contact with said inking pad and with said record surface.

8. In a recording device: the combination with a movable record surface, a hinged mechanism casing, a recording arm and marking means carried by same, of a source of marking fluid carried by said hinged casing, and means to cause said marking means to periodically make contact with said source of marking fluid and with said record surface.

9. In a recording device: a movable record surface; recording means; and a source of marking fluid comprising a retaining receptacle in the path of said recording means, and absorbent material within said receptacle having a portion thereof exposed to the said recording means.

10. In a recording device: a movable record surface; recording means; and a source of marking fluid comprising a retaining receptacle in the path of said recording means, absorbent material within said receptacle having a portion thereof exposed to the said recording means, and a well for the marking fluid, connected to said receptacle and into which the said absorbent material dips.

11. In a recording device: an inking pad comprising a tube cut longitudinally at one side; and a suitable absorbent material for the marking fluid, within said tube and exposed along the longitudinal cut.

12. In a recording device: a recording arm; and a capillary marking tube carried by said arm, open at both ends, and substantially perpendicular to said arm.

13. In a recording device: a recording arm; a capillary tube carried by said arm, open at both ends, and substantially perpendicular to said arm; and a glass, capillary marking tip carried by said tube.

14. In a recording device: a recording arm; an inking pad comprising a tube cut longitudinally at one side, and a suitable absorbent material for the marking fluid within said tube and exposed along the longitudinal cut; and a capillary marking tube reduced at one end and carried by said recording arm.

15. In a recording device: a recording arm; an inking pad comprising a tube cut longitudinally at one side; a suitable absorbent material for the marking fluid, within said tube and exposed along the longitudinal cut; a capillary tube carried by said recording arm; and a second capillary marking tube carried by said tube.

16. In a recording device: a recording arm; an inking pad comprising a tube cut longitudinally at one side; a suitable absorbent material for the marking fluid, within said tube and exposed along the longitudinal cut; a capillary tube carried by said recording arm; and a second glass capillary marking tip carried by said tube.

Signed at New York in the county of New York and State of New York this 22nd day of December A. D. 1908.

WILLIAM H. BRISTOL.

Witnesses:
FREDK. SCHUETZ,
SALLY O. YUDIZKY.